(12) United States Patent
Rhodes

(10) Patent No.: US 7,935,228 B1
(45) Date of Patent: May 3, 2011

(54) LOW EMISSION NATURAL GAS PROCESSING DEHYDRATION SYSTEM

(75) Inventor: James E. Rhodes, Farmington, NM (US)

(73) Assignee: Process Equipment & Service Company, Inc., Farmington, NM (US)

(*) Notice: Subject to any disclaimer, the term of this patent is extended or adjusted under 35 U.S.C. 154(b) by 791 days.

(21) Appl. No.: 11/942,383

(22) Filed: Nov. 19, 2007

(51) Int. Cl.
*B01D 3/06* (2006.01)
*B01D 19/00* (2006.01)
*F25J 3/06* (2006.01)

(52) U.S. Cl. ............... 203/18; 62/119; 62/121; 62/620; 95/156; 95/266; 203/39; 203/88; 203/100

(58) Field of Classification Search ............... 62/119, 62/121, 611, 617, 620; 95/156, 241, 266; 96/193; 159/2.1; 202/185.3, 202; 203/18, 203/39, 88, 91, 100
See application file for complete search history.

(56) References Cited

U.S. PATENT DOCUMENTS

| | | | |
|---|---|---|---|
| 5,029,557 A * | 7/1991 | Korenberg | 122/149 |
| 5,163,981 A | 11/1992 | Choi | |
| 5,520,723 A * | 5/1996 | Jones, Jr. | 95/161 |
| 5,665,144 A | 9/1997 | Hill et al. | |
| 5,766,313 A * | 6/1998 | Heath | 95/161 |
| 6,251,166 B1 * | 6/2001 | Anderson | 95/166 |
| 6,773,554 B1 * | 8/2004 | Moore, Jr. | 203/87 |
| 7,531,030 B2 * | 5/2009 | Heath et al. | 96/183 |

* cited by examiner

*Primary Examiner* — Virginia Manoharan
(74) *Attorney, Agent, or Firm* — Head, Johnson & Kachigian, P.C.

(57) ABSTRACT

A process to reduce emissions discharged from a natural gas processing system wherein the processing system includes a glycol dehydrator for absorbing water, moisture and absorbable hydrocarbons, a reboiler for heating water rich glycol, a still column in communication with the reboiler and a reflux condenser. The process includes the steps of directing vapors and gases from the still column and reflux condenser to a condenser in order to condense vapors to liquid. The gases and liquids from the condenser are directed to a condensate separator in order to separate by gravity. Non-condensible vapors and water from the condensate separator are delivered to a vaporization chamber immersed in the reboiler. Water is re-vaporized into steam and permitted to mix with non-condensible vapors in the vaporization chamber. The steam and non-condensible vapors are inducted into a combustion zone in a firetube in the reboiler. The hydrocarbons in the vapors are combusted in the firetube.

4 Claims, 1 Drawing Sheet

LOW EMISSION NATURAL GAS PROCESSING DEHYDRATION SYSTEM

BACKGROUND OF THE INVENTION

1. Field of the Invention

The present invention relates to a process to reduce emissions discharge from a natural gas processing dehydration system. In particular, the invention relates to a self-contained natural gas processing system which eliminates discharge of gaseous hydrocarbons to the environment.

2. Prior Art

Natural gas processing systems are used to treat and purify raw natural gas that is obtained from subterranean locations and delivered to the surface. The treated natural gas is used in a wide variety of fuel applications.

The natural gas delivered to the surface contains primarily methane but also includes aromatic and other gaseous hydrocarbons including ethane, propane; butane, and pentanes, as well as carbon dioxide, hydrogen sulfide, mercaptans, nitrogen, water, water vapor, and liquid hydrocarbons, such as crude oil.

It is common practice and is necessary to process or condition the natural gas in the field near the wellhead in order to remove some of these materials before transporting the natural gas. Removal of water and water vapors is necessary to prevent clogging of pipelines with liquid water and liquid hydrocarbons which may separate, to prevent formation of methane hydrates, and to prevent corrosion of tanks, pipelines and other metal equipment.

In a typical natural gas processing dehydration configuration, a separator is used to separate the natural gas from the water and water vapor. A liquid desiccant absorbs the water, moisture and absorbable hydrocarbons in the separator and then the natural gas is removed and transported for use. Examples of liquid desiccant include diethylene glycol and triethylene glycol. The moisture rich desiccant is then processed through a dehydrator to remove the water moisture and absorbed hydrocarbons so that the desiccant may be recycled. In the past, gaseous emissions were released to the atmosphere and liquid emissions containing hydrocarbons were dispersed off. Increasingly, it is unacceptable to release hydrocarbons into the environment.

There have been a number of previous proposals to reduce polluting emissions from natural gas processing systems. Hill et al. (U.S. Pat. No. 5,665,144) proposes reclaiming uncondensed hydrocarbons normally exhausted to the atmosphere. Water and hydrocarbon liquid, however, are simply sent to a storage container which remains and requires disposal.

Choi (U.S. Pat. No. 5,163,981) proposes controlling discharge of pollutants from natural gas dehydrators, however, water and entrained hydrocarbon gas is simply separated out by the system and requires proper disposal.

Accordingly, the present invention provides a novel system and process in order to reduce emissions from a natural gas processing system.

The present invention also provides a self-contained natural gas processing system that will dispose of any liquid hydrocarbons and hydrocarbon gas generated during the processing.

The present invention also provides a natural gas processing system wherein separated water and hydrocarbon gas is used in the reboiler to control the temperature in the reboiler.

SUMMARY OF THE INVENTION

The present invention is directed to a low emission natural gas processing dehydration system. Natural gas is delivered to a contactor tower where it is passed in exchange with a liquid desiccant, such as glycol. Water and water vapor along with some hydrocarbons are absorbed into the glycol.

The water rich glycol exits the contactor tower and is delivered to a regenerator. The regenerator includes a reboiler where the glycol is heated. The water, water vapors and absorbed hydrocarbons are driven off as vapors and exit the reboiler via a still column and a reflux condenser.

The reboiler includes a burner operating within a firetube which extends to and terminates in a chimney. Water and vapors from the still column exit the reflux condenser via a line to an air-cooled condenser where the water and condensible hydrocarbons are condensed out.

The three phase stream consisting of water, hydrocarbon liquid and non-condensible vapors enters a condensate separator via a line from the air-cooled condenser. Hydrocarbon liquid is separated out by gravity and exits the condensate separator.

Non-condensible vapors and water along with the absorbed hydrocarbons exit the condensate separator and are conveyed, utilizing natural draft forces and gravity, to a vaporization chamber immersed in hot glycol in the reboiler. In the vaporization chamber, the water is re-vaporized into steam and mixes with the non-condensible vapors. All of the hydrocarbons present, including those previously entrained in the water, are combusted in the firetube of the reboiler and also result in a significant reduction of fuel gas required for the reboiler.

Steam induction into the combustion zone of the firetube also cools the combustion process, thereby significantly limiting formation of nitrogen oxides.

DETAILED DESCRIPTION OF THE PREFERRED EMBODIMENTS

Figure 1:
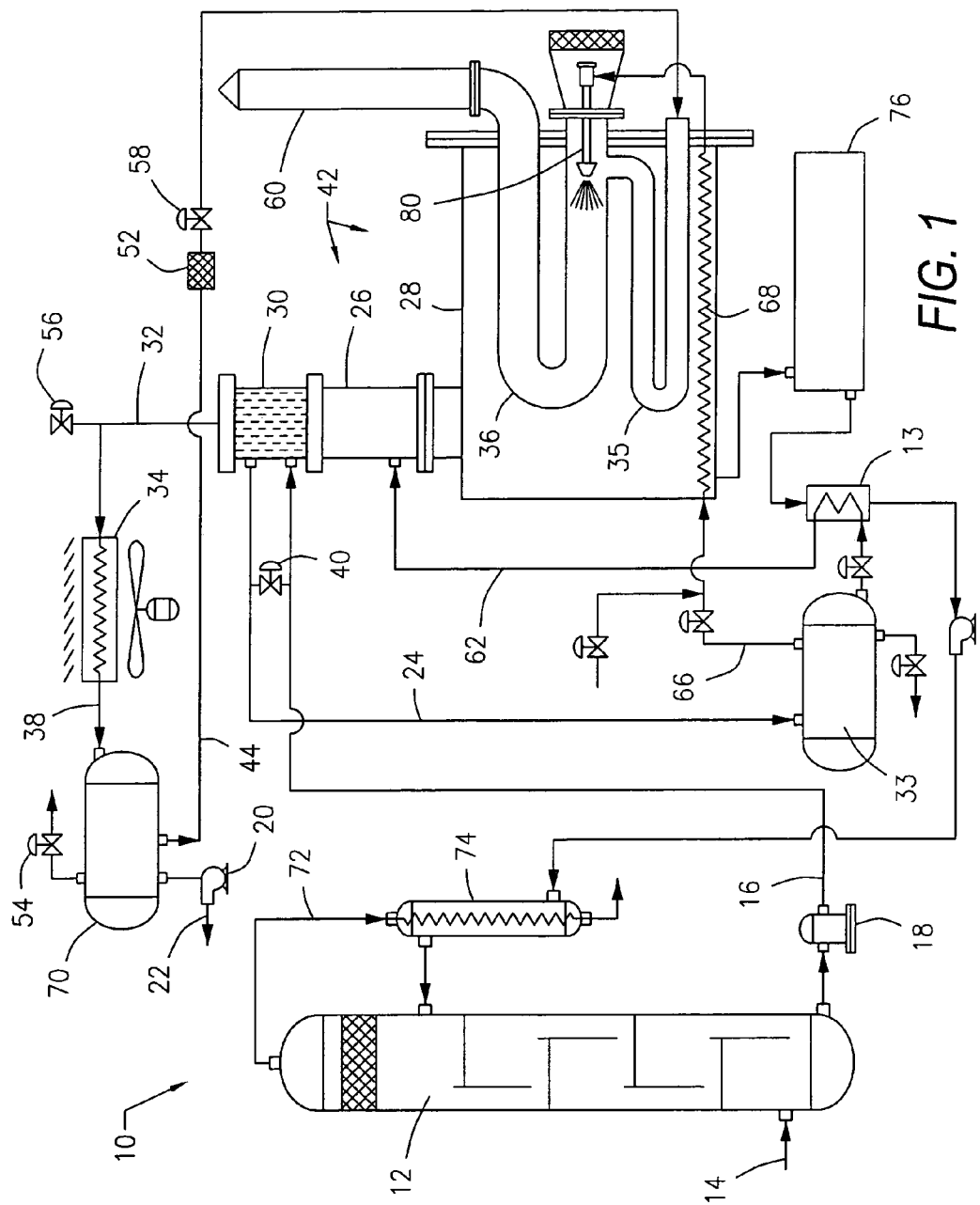
FIG. 1 is a simplified diagram of a low emission natural gas processing dehydration system as set forth in the present invention.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

FIG. 1 is a schematic diagram or illustration of a low emission natural gas processing dehydration system 10. A known contactor tower 12 is utilized in which produced natural gas delivered to the surface is directed through an inlet 14 and is contacted with a liquid desiccant, such as glycol, for removal of water and water vapor. The glycol may be passed in counter current with the incoming natural gas. The contactor tower is normally operated under pressure above atmospheric pressure. In the contactor tower 12, some hydrocarbons from the inlet stream, including aromatic hydrocarbons, are also absorbed by the glycol.

Dry gas exits the contactor tower 12 via a line 72 and may be optionally passed in heat exchange with returning incoming glycol through a heat exchanger 74. The dry gas may then be transported for further processing and/or use.

The water rich glycol exits the contactor tower 12 via a line 16 and may be delivered or pumped through a filter 18 and routed to a reflux condenser 30 in the still column 26, which controls the glycol concentration in the overhead vapors 32 (to be described later in detail). The temperature of the reflux condenser 30 may be controlled with a by-pass valve 40, which regulates the glycol through the reflux condenser 30 and may be manually operated or automatically thermostatically controlled.

The water rich glycol is delivered from the reflux condenser 30 via a line 24 and then flashed in a low-pressure separator 33, which is operated at approximately 10% to 20% of the contactor tower 12 pressure. The flash gas may be removed via a line 66, passed through a preheat coil 68 in a reboiler (to be described), and be used as fuel for a regenerator 42 and/or flare stack (not shown).

Liquid hydrocarbons are separated from the water rich glycol by gravity in the low-pressure separator 33 as shown by a line 46. The water rich glycol is then delivered from the low pressure separator to and preheated in a lean/rich heat exchanger 13 before being routed, via a line 62 to the still column 26, to a reboiler 28. In the reboiler 28, the glycol is heated and the water and absorbed hydrocarbons are driven off as vapor. The absorbed hydrocarbons and water exit the reboiler 28 via the still column 26 and the reflux condenser 30.

The reboiler 28 includes a burner 80 operating with a firetube 82. The firetube 82 for the reboiler extends to and terminates in a chimney.

Vapors from the still column 26 exit the reflux condenser 30 via a line 32. A vent valve 56 is utilized to provide pressure relief in the event that the glycol dehydration unit require ESD (emergency shut-down).

The remaining glycol in the reboiler 28, minus water, moisture, and absorbed hydrocarbons, may be removed and sent to a storage tank 76 before being recirculated back to the contactor 12.

As shown in FIG. 1, overhead vapors from the reflux condenser 30 pass via a line 32 to an air-cooled condenser 34 where the water and condensable hydrocarbons are condensed out. In lieu of an air-cooled condenser 34, a gas cooled condenser (not shown) may be used, utilizing the dry gas stream exiting the contactor tower 12.

The three-phase stream, consisting of water, hydrocarbon liquid and non-condensable vapors, enters a condensate separator 70 via a line 38 from the air cooled condenser. The hydrocarbon liquid is separated out by gravity and exits the condensate separator 70 via a pump 20 and a line 22. In lieu of a pump, a self-emptying chamber (not shown) may be used. The hydrocarbon liquid exiting the condensate separator 70 is both usable and saleable.

As a critical part of the invention, non-condensable vapors and water exit the condensate separator 70 and are conveyed, utilizing natural draft forces and gravity, via a line 44 through an optional flash arrestor 52 and a thermostatically-controlled low-temperature shut-down valve 58.

The non-condensable vapors and water are then conducted into a vaporization chamber 35, which is immersed in hot glycol in the reboiler 28. In the vaporization chamber 35, the water is re-vaporized into steam and mixes with the non-condensable vapors. The natural draft created by combustion in a firetube 82 and combustion gas flow in the connected chimney flue stack 60 inducts the steam/non-condensable vapor mix into the combustion zone in the firetube 82. All of the hydrocarbons present, including those previously entrained in the water, are combusted in the firetube 82 of the reboiler 28. The hydrocarbons present also result in a significant reduction of fuel gas required to fire the reboiler 28.

Steam induction into the combustion zone of the firetube 82 also cools the combustion process, thereby significantly limiting the formation of nitrogen oxides (NOX), a leading contributor to ozone formation. The U.S. EPA regulates and enforces NOX emission levels.

Returning to a consideration of the condensate separator, a thermostatically controlled valve 54 diverts non-condensable vapors to a flare stack (not shown) in the event of high reboiler temperature.

The overall result of utilizing the present invention is that it essentially eliminates all waste streams from a natural gas processing glycol dehydration unit. No hydrocarbons are released to the atmosphere and there is no trucking, treating and/or disposal required for contaminated water.

The use of steam induction into the combustion zone of the firetube also results in a low NOX device.

Whereas, the present invention has been described in relation to the drawings attached hereto, it should be understood that other and further modifications, apart from those shown or suggested herein, may be made within the spirit and scope of this invention.

What is claimed is:

1. A process to reduce emissions discharge from a natural gas processing system, wherein said processing system includes a glycol dehydrator for absorbing water, moisture and absorbable hydrocarbons, a reboiler for heating water rich glycol to produce vapors, a still column in communication with said reboiler, and a reflux condenser, which process comprises:
    directing vapors and gases from said still column and said reflux condenser to a condenser in order to condense vapors to liquid;
    directing gases and liquids from said condenser to a condensate separator in order to separate by gravity;
    removing hydrocarbon liquids from said condensate separator;
    delivering non-condensible vapors and water from said condensate separator to a vaporization chamber immersed in said reboiler;
    revaporizing said water into steam and permitting mixing with said non-condensable vapors in said vaporization chamber;
    inducting said steam and non-condensable vapors into a combustion zone in a firetube in said reboiler; and
    combusting hydrocarbons contained in said vapors in said firetube.

2. A process as set forth in claim 1 wherein said condenser is an air-cooled condenser.

3. A process as set forth in claim 1 wherein said condenser is a natural gas cooled condenser.

4. A process as set forth in claim 1 wherein said non-condensible vapors and water from said condensate separator pass through a flash separator prior to delivery of to said reboiler.

* * * * *